United States Patent [19]

Kajiyama et al.

[11] Patent Number: 5,331,448
[45] Date of Patent: Jul. 19, 1994

[54] LIQUID CRYSTAL DISPLAY DEVICE AND PREPARATION AND USE THEREOF

[75] Inventors: Tisato Kajiyama, Fukuoka; Junichi Ono, Osaka; Tohru Kashiwagi, Osaka; Kouji Hara, Osaka; Kensaku Takata, Osaka, all of Japan

[73] Assignee: Sumitomo Electric Industries, Ltd., Osaka, Japan

[21] Appl. No.: 934,747

[22] PCT Filed: Feb. 5, 1992

[86] PCT No.: PCT/JP92/00111
§ 371 Date: Oct. 5, 1992
§ 102(e) Date: Oct. 5, 1992

[87] PCT Pub. No.: WO92/14185
PCT Pub. Date: Aug. 20, 1992

[30] Foreign Application Priority Data

Feb. 5, 1991 [JP] Japan .................. 3-014537
Feb. 5, 1991 [JP] Japan .................. 3-014538
Mar. 14, 1991 [JP] Japan .................. 3-014883[U]
Aug. 8, 1991 [JP] Japan .................. 3-199080

[51] Int. Cl.⁵ ............................ G02F 1/13
[52] U.S. Cl. .................. 359/103; 359/38; 359/70
[58] Field of Search ............ 359/38, 70, 100, 104, 359/99, 103

[56] References Cited

U.S. PATENT DOCUMENTS 4,822,143 4/1989 Zondler .................. 359/104
5,034,153 7/1991 Uchida .................. 359/104

FOREIGN PATENT DOCUMENTS 0260786 3/1988 European Pat. Off. .
49-95881 9/1974 Japan .
49-110581 10/1974 Japan .
58-501631 3/1983 Japan .
62-183431 8/1987 Japan .
2222487 9/1990 Japan .

OTHER PUBLICATIONS

F. Schneider and N. K. Sharma, Influence of the Amino Substituent on the Induction of Smectic Phases, Aug. 13, 1981, A. Naturforsch, 30n, 1086–1091 (1981).

Primary Examiner—William L. Sikes
Assistant Examiner—Huy Mai
Attorney, Agent, or Firm—Cushman, Darby & Cushman

[57] ABSTRACT

A liquid crystal device having a pair of electrodes at least one of which is transparent and a mixture film of a side chain type liquid crystalline polymer and at least two low molecular weight liquid crystals which film is sandwiched between said pair of electrodes, wherein said mixture film contains 0.005 to 1% by weight of an electrolyte based on a total weight of the mixture film. This liquid crystal device has a high response speed and memory and is used in a variable traffic control sign, a light-adjusting window, a liquid crystal glare-proof mirror, and the like.

14 Claims, 3 Drawing Sheets

LIQUID CRYSTAL DISPLAY DEVICE AND PREPARATION AND USE THEREOF

FIELD OF THE INVENTION

The present invention relates to a liquid crystal display device which can be used, for example, for a TV screen, various office automation instruments and other display panels, a process for preparing the same and use of the same, for example, as a variable traffic control sign, a light-adjusting window and a liquid crystal glare-proof mirror.

DESCRIPTION OF THE PRIOR ART

Hitherto, a liquid crystal display device has been formed by injecting a liquid crystal material between a pair of transparent electrodes which are fixed with a gap of several micrometers. However, such structure does not enable the production of the display having a large area. In addition, brightness of the screen and an angle of view field are insufficient, since it is necessary to attach polarization plates having polarization axes which are perpendicular to each other to a pair of glass substrates enclosing the liquid crystal material.

In addition, in the conventional liquid crystal display device except one using a ferroelectric liquid crystal, an orientated state has no memory so that an active matrix driving such as TFT which is produced in a low yield should be used to produce a display screen having a large number of picture elements. Therefore, the production cost increases. When the ferroelectric liquid crystal is used, a very thin cell gap control of 1 to 2 μm and a uniform orientation of liquid crystal molecules are necessary, so that the ferroelectric liquid crystal cannot provide a satisfactory display even in a small area.

Recently, a new liquid crystal display device has been developed (cf. Japanese Patent Kokai Publication Nos. 193115/1990 and 127494/1990, Chem. Lett., 817 (1989) and Polymer Preprints, Japan, 39 (8), 2373 (1990)). This device is prepared by cast coating a solution of a side chain type liquid crystalline polymer having a side chain to which a moiety corresponding to a liquid crystal compound is bonded and a conventional low molecular weight liquid crystal in a solvent on a plate-form support or a film such as a transparent electrode, drying and solidifying the solution to form a mixture film of the liquid crystalline polymer and the low molecular weight liquid crystal and placing another support thereon.

In the above liquid crystal display device, when a low frequency or a direct current is applied on the mixture film, ions move in accordance with an electric field in the mixture film so that the orientation of the liquid crystal molecules is disturbed to strongly scatter an incident light and the film becomes opaque. When a high frequency is applied on the mixture film of the liquid crystalline polymer and the low molecular weight liquid crystal, the liquid crystal molecules in the film are homeotropically orientated by the electro-optic effect in a direction of an electric field, so that the incident light passes through the film without being scattered and the film becomes transparent. In this liquid crystal display device, after the electric field is removed, the display device has memory and maintains scattered or non-scattered states of light stably.

In the conventional mixture film of the liquid crystalline polymer and the low molecular weight liquid crystal, since a single low molecular weight liquid crystal is used, a temperature range of the smectic phase which exhibits the memory is narrow and it does not function at room temperature. Polym. Preprints, Japan, 39 (8), 2373 (1990) discloses a system comprising two low molecular weight liquid crystals. A function of one of the two low molecular weight liquid crystals is to replace the mesogen groups of the liquid crystalline polymer.

The change from the transparent state to the opaque state of the above mixture film is caused by the movement of the ions which present in a slight amount in the mixture film in accordance with the direct current or low frequency field. But, a response speed of this change is low so that stability and reproducibility of the response to the application of the electric field are poor.

One example of a variable traffic control sign uses a LED. As a traffic control sign which is a modification of one using the LED, a traffic control sign using a TN type liquid crystal display device or a ferroelectric liquid crystal display device as a display panel is proposed.

However, the conventional variable traffic control device using the LED has drawbacks in its weight and cost and is practically unsatisfactory.

Since the variable traffic control sign using the TN type liquid crystal display device requires polarization plates, the display panel becomes dark so that its visibility is low, the polarization plates have poor durability and the angle of view field is limited.

As a light-adjusting window, there is known a window which uses a liquid crystal device consisting of a film-form liquid crystal layer which comprises a cured resin matrix and a liquid crystal material dispersed therein and is sandwiched by a pair of transparent substrates bearing transparent electrodes (cf. Japanese Patent Kokai Publication No. 824/1990, Japanese Utility Model Kokai Publication No. 10523/1990 and Japanese Patent Kokai Publication No. 24630/1990). This window becomes a light-transmitting state when a voltage is applied, while it becomes a light-scattering state when the voltage is not applied.

However, with the conventional light-adjusting window, it is necessary to continue the application of the voltage to maintain the light-transmitting state. Therefore, when such window is used in an application where a suitable transmittance is maintained for a long time, it is economically unpreferable in view of electric power consumption.

As a conventional glare-proof mirror, there are known a mirror comprising a mirror body and a liquid crystal device (a light-adjusting material) which is laminated on the mirror body and has a liquid crystal layer comprising a cured resin matrix and a liquid crystal material dispersed therein and a pair of transparent substrates bearing transparent electrodes which sandwich the liquid crystal layer (cf. for example, Japanese Utility Model Kokai Publication No. 75601/1990) and a mirror consisting of a mirror body and a liquid crystal device comprising an encapsulating medium made of a transparent resin, etc. and a bulk or particles of a functionally nematic low birefringence liquid crystal containing a polygenetic dye which is encapsulated in the medium in a deformed structure from its natural structure (cf. Japanese Patent Kokai Publication No. 283316/1987).

The former glare-proof mirror adjusts a reflectance of the mirror body using a property of the liquid crystal layer that the crystal layer becomes the light-transmitting state when the voltage is applied while it becomes the light-scattering state when the voltage is not applied.

The latter glare-proof mirror adjusts a reflectance of the mirror body using properties of the liquid crystal device that a state of the liquid crystal changes from the above deformed state to an aligned state when the voltage is applied on the bulk or particles of the liquid crystal and that the polygenetic dye contained in the liquid crystal bulk or particles absorbs a large amount of light when the liquid crystal is in the deformed state while the light absorbance by the dye is minimum when the liquid crystal is in the aligned state.

However, in any of the above glare-proof mirrors, it is necessary to continue the application of voltage to the liquid crystal device in order to maintain the light transmitting state of the liquid crystal device and keep the maximum reflectance of the mirror. Therefore, when such mirror is used in an application where a suitable reflectance is maintained for a long time, it is economically unpreferable in view of electric power consumption.

SUMMARY OF THE INVENTION

One object of the present invention is to provide a liquid crystal device which can be used in a wide range of temperature including room temperature, is excellent in flexibility, a response speed and stability and reproducibility of response and is practically used with satisfaction, and a method for producing such liquid crystal device.

Another object of the present invention is to provide a variable traffic control sign which is light, cheap and thin, is excellent in visibility and durability and has a large angle of view field.

A further object of the present invention is to provide a light-adjusting window which is freely changed between a light-scattering state and a light-transmitting state and can maintain either of the light-scattering state and the light-transmitting state without the application of a voltage for a long time.

A yet further object of the present invention is to provide a liquid crystal glare-proof mirror which can freely change a reflectance of a mirror body and maintain any reflectance without the application of a voltage for a long time.

According to a first aspect of the present invention, there is provided a liquid crystal device comprising a pair of electrodes at least one of which is transparent and a mixture film of a side chain type liquid crystalline polymer and at least two low molecular weight liquid crystals which film is sandwiched between said pair of electrodes, wherein said mixture film contains 0.005 to 1% by weight of an electrolyte based on a total weight of the mixture film.

According to a second aspect of the present invention, there is provided a method for producing a liquid crystal device comprising steps of applying a solution containing a side chain type liquid crystalline polymer, at least two low molecular weight liquid crystals and electrolyte on one of a pair of electrodes, drying and solidifying the applied solution to form a mixture film containing said side chain type liquid crystalline polymer, said at least two low molecular weight liquid crystals and said electrolyte, and placing the other one of the electrodes on the mixture film.

According to a third aspect of the present invention, there is provided a method for producing a liquid crystal device comprising steps of placing an amount of a mixture containing a side chain type liquid crystalline polymer, at least two low molecular weight liquid crystals, an electrolyte and a spacer on an edge part of one of a pair of electrode films, placing the other one of the electrode films on the surface of said electrode film carrying said mixture and compressing said electrodes films from said edge portion carrying said solution with at least one roll.

According to a fourth aspect of the present invention, there is provided a variable traffic control sign at least a part of which comprises a liquid crystal device comprising a smectic or induced smectic mixture of a liquid crystalline polymer and a low molecular weight liquid crystal and having a reversible histability (memory) between a light-transmitting state and a light-scattering state.

According to a fifth aspect of the present invention, there is provided a variable traffic control sign at least a part of which comprises a mixture of a liquid crystal device comprising a mixture of a polymer and a low molecular weight liquid crystal, which mixture is in a light-scattering state without application of a voltage and in a light-transmitting state with application of a voltage.

According to a sixth aspect of the present invention, there is provided a light-adjusting window a part of which comprises a liquid crystal device comprising a pair of transparent substrates and a mixture of a liquid crystalline polymer and a low molecular weight liquid crystal which is placed between said pair of the substrates and having a reversible histability between a light-scattering state and a light-transmitting state.

According to a seventh aspect of the present invention, there is provided a liquid crystal glare-proof mirror comprising a mirror body and a liquid crystal device which comprises a mixture film of a liquid crystalline polymer and a low molecular weight liquid crystal and is placed on at least a part of a surface of said mirror body. In particular, the liquid crystalline polymer is a side chain type liquid crystalline polymer comprising a polymer main chain and a side chain having a moiety corresponding to a liquid crystal compound which is bonded to said main chain through a flexible carbon chain and the like.

DETAILED DESCRIPTION OF THE INVENTION

Figure 1:
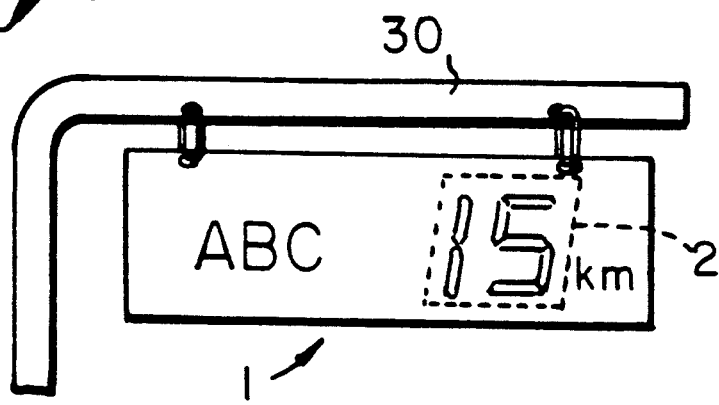
FIG. 1 is a perspective view of an example of a variable traffic control sign of the present invention.

The liquid crystal device of the present invention operates in a wide range of temperature since the mixture film of the side chain type liquid crystalline polymer and the low molecular weight liquid crystals in the liquid crystal device contains at least two low molecular weight liquid crystals.

The above low molecular weight liquid crystals may contain a low molecular weight liquid crystal which can replace the side chain liquid crystal moiety of the liquid crystalline polymer.

The low molecular weight liquid crystal which replaces the side chain liquid crystal moiety of the liquid crystalline polymer is selected as follows:

Selection of a Low Molecular Weight Liquid Crystal Which Replaces A Side Chain Liquid Crystal Moiety An alternating current of 1 KHz and 90 V is applied to a mixture of a liquid crystalline polymer, a low molecular weight liquid crystal to be examined whether or not it can replace the side chain liquid crystal moiety of the liquid crystalline polymer and a low molecular weight liquid crystal which does not replace the side chain liquid crystal moiety (in a weight ratio of 4/1/5, 3/2/5, 2/3/5 or 1/4/5) for 5 seconds.

With the mixture which is made transparent after the application of the alternating current, when its transparency is not changed after 60 seconds from stopping the application of the alternating current at all the mixing ratios and also it is made opaque by the application of a direct current of 90 V for 5 seconds and its state does not change after 60 seconds from stopping the application of the direct current, the low molecular weight liquid crystal to be examined contained in this mixture is regarded as a low molecular weight liquid crystal which replaces the side chain liquid crystal moiety of the liquid crystalline polymer.

For example, a low molecular weight liquid crystal having one of the following structure can be selected in connection with the following liquid crystalline polymers:

Side chain liquid crystals moieties of the liquid crystalline polymers

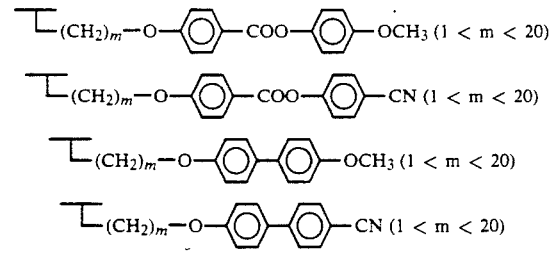

Low molecular weight liquid crystals for replacing the side chain liquid crystal moiety of the liquid crystalline polymers

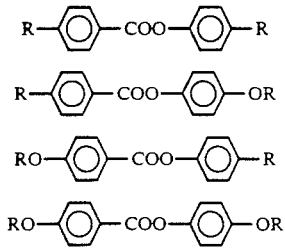

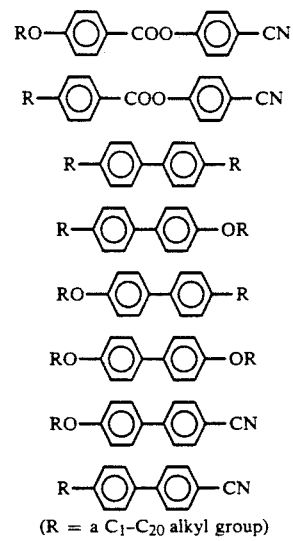

(R = a $C_1$-$C_{20}$ alkyl group)

and a low molecular weight liquid crystal having one of the above structure in which one or both of the benzene rings are cyclohexane rings.

The low molecular weight liquid crystals include various commercially available low molecular weight liquid crystals (a single component or a mixture).

As the above liquid crystalline polymers, either of one showing a smectic phase and one showing a nematic phase may be used. When both the liquid crystalline polymer and the low molecular weight liquid crystals show the nematic phase, it is necessary to select a combination of them which induces a smectic phase.

A kind of the main chain of the above side chain type liquid crystalline polymer is not limited. A siloxane main chain, a polyether main chain, polyethylene main chain and the like may be used. A kind of a spacer part which connects the main chain of the side chain type liquid crystalline polymer and a mesogen group is not limited either, and an ethylene chain, a siloxane chain, a polyether chain and the like may be used. The mesogen group is not limited and various mesogen groups which are conventionally used may be used.

A ratio of the liquid crystalline polymer to the low molecular weight liquid crystal may depend on their molecular structures and is preferably from 1:9 to 6:4 in weight. When the ratio of the liquid crystalline polymer is larger than the above range, the response speed decreases, while when the ratio of the low molecular weight liquid crystal is larger than the above range, an degree of light scattering is insufficient.

The above mixture film contains the electrolyte in an amount of 0.005 to 1% by weight., With the ions generated by the electrolyte, the response speed is increased and the change between the transparent state and the opaque state is surely caused with good reproducibility.

As the above electrolyte, any one that is soluble in the coating solution can be used. For example, a quaternary ammonium salt of the following formula is used:

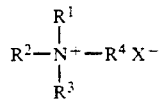

wherein $R^1$, $R^2$, $R^3$ and $R^4$ are the same or different and each an alkyl group such as a methyl group, an ethyl group, a propyl group, an isopropyl group, a butyl group, a pentyl group or a hexyl group; and X is F, Cl, Br, I, $ClO_4$, $PF_4$, $BF_4$, etc.

The electrolytes may be used independently or as a mixture.

In the mixture film, any of conventionally used dichroic dye can be compounded in order to provide a color displaying type liquid crystal device.

As the spacer to be used in the production method according to the third aspect of the present invention, any one that is generally used in the liquid crystal device can be used. Its shape may be a sphere or a rod, and its material may be a resin, glass, silica and the like.

As a pair of transparent electrodes which sandwich the above mixture film, glass plates or plastic films (e.g. films of polyethylene terephthalate (PET), polyether sulfone (PES), etc.) on which a conductive film such as ITO (indium tin oxide) or $SnO_2$ is formed by evaporation or sputtering are exemplified. In addition, a transparent conductive glass or film which is usually used in the liquid crystal device can be used.

In the second aspect of the present invention, the above coating solution is applied on one of the transparent electrodes, dried and solidified to from the mixture film and then, on the mixture film, the other transparent electrode is placed to assemble the liquid crystal device. Therefore, this method has no redundant step in comparison with the conventional method for producing the liquid crystal device.

A ratio of the components in the coating solution is selected depending on the method for applying the coating solution on the transparent electrode or a thickness of the formed mixture film.

As the method for applying the coating solution on the transparent electrode, any of the conventional coating manners such as bar coating, spin coating, spray coating or roll coating can be employed.

In the third aspect of the present invention, an amount of the the above mixture of the side chain type liquid crystalline polymer, the low molecular weight liquid crystals, the electrolyte and the spacer is placed on an edge part of one of the electrodes and the electrode carrying the coating solution is compressed to the other electrode from the edge portion carrying the mixture with at least one roll. Therefore, this method has no redundant step in comparison with the conventional method for producing the liquid crystal device.

The coating mixture can be placed on the edge part of the electrode by (1) mixing the spacer in the solution of the liquid crystalline polymer, the low molecular weight liquid crystals and the electrolyte in the solvent, applying the solution in which the spacer is dispersed on the one edge part of the electrode and drying the coated solution to remove the solvent, (2) mixing the spacer in the solution of the liquid crystalline polymer, the low molecular weight liquid crystals and the electrolyte in the solvent, removing the solvent to obtain a mixture, and applying the mixture on the one edge part of the electrode, or (3) mixing the liquid crystalline polymer, the liquid crystals and the electrolyte without any solvent to obtain a mixture and applying the mixture on the one edge part of the electrode.

EXAMPLES

The present invention will be explained further in detail by the following examples. The present invention is not limited by the following examples. In the examples, "parts" are "parts by weight".

EXAMPLE 1

In a mixed solvent of acetone and dichloroethane (50:50 by weight), poly(4-cyanophenyl-4'-hexyloxybenzoate methylsiloxane) (30 parts) as a liquid crystalline polymer, E63 (manufactured by Merk Japan, which is assumed to contain at least 5 low molecular weight liquid crystals) (20 parts) as low molecular weight liquid crystals and tetraethylammonium bromide in an amount of 0.05% by weight based on the total weight of the liquid crystals were dissolved to obtain a coating solution.

The coating solution was coated on a transparent conductive film (ITO-PES) having a thickness of 100 $\mu$m with a bar coater and dried at room temperature for 30 minutes to form a mixture film. Then on the mixture film, another transparent conductive film was laminated to produce a liquid crystal device.

EXAMPLE 2

In the same manner as in Example 1 except using 25 parts of poly(4-methoxyphenyl-4'-hexyloxybenzoate methylsiloxane) as the liquid crystalline polymer and 25 parts of above E63 as the low molecular weight liquid crystals, a liquid crystal device was produced.

EXAMPLE 3

In the same manner as in Example.1 except using 10 parts of poly(4-methoxyphenyl-4'-hexyloxybenzoate methylsiloxane) as the liquid crystalline polymer, 15 parts of 4'-n-octyloxyphenyl-4-n-butylbenzoate as a low molecular weight liquid crystal for replacing the mesogen group of the liquid crystalline polymer and 25 parts of above E63 as the low molecular weight liquid crystals, a liquid crystal device was produced.

EXAMPLE 4

In the same manner as in Example 1 except using 14 parts of poly(4-cyanophenyl-4'-hexyloxybenzoate methyl-siloxane) as the liquid crystalline polymer, 14 parts of 4'-n-octyloxyphenyl 4-n-butylbenzoate as a low molecular weight liquid crystal for replacing the mesogen group of the liquid crystalline polymer and 22 parts of E31LV (manufactured by Merk Japan, which is assumed to contain at least 7 low molecular weight liquid crystals) as the low molecular weight liquid crystals, a liquid crystal device was produced.

EXAMPLE 5

In the same manner as in Example 3 except using 4'-n-hexyloxyphenyl 4-n-pentylbenzoate as a low molecular weight liquid crystal which replaces the mesogen group of the liquid crystalline polymer, a liquid crystal device was produced.

EXAMPLE 6

In the same manner as in Example 3 except using 4'-n-pentyloxyphenyl 4-n-hexylbenzoate as a low molecular weight liquid crystal which replaces the mesogen group of the liquid crystalline polymer, a liquid crystal device was produced.

EXAMPLE 7

In the same manner as in Example 3 except using 4'-n-pentylphenyl 4-n-hexyloxybenzoate as a low molecular weight liquid crystal which replaces the mesogen group of the liquid crystalline polymer, a liquid crystal device was produced.

EXAMPLE 8

In the same manner as in Example 4 except using 4'-n-pentylphenyl 4-n-cyanobenzoate as a low molecular weight liquid crystal which replaces the mesogen group of the liquid crystalline polymer, a liquid crystal device was produced.

EXAMPLE 9

In a mixed solvent of acetone and dichloromethane (50:50 by weight), poly(4-methoxyphenyl-4'-hexyloxybenzoate methylsiloxane) (10 parts) as a liquid crystalline polymer, 4'-n-octyloxyphenyl 4-n-butylbenzoate (15 parts) as a low molecular weight liquid crystal which replaces the mesogen group of the liquid crystalline polymer, above E63 (25 parts) and Epostar (manufactured by Nippon Catalyst Co., Ltd. having a particle size of 10 μm) as a spacer in an amount of 2% by weight based on the total weight of the liquid crystals were mixed, and the mixture was dried at 80° C. for one hour to remove the solvent to obtain a mixture.

Then, the mixture was placed on one edge part of one transparent conductive film. Another transparent conductive film was laminated on the first transparent conductive film by pressing them with a pair of rolls from the edge part carrying the mixture.

EXAMPLE 10

In the same manner as in Example 1 except using 0.05% by weight of tetrabutylammonium bromide as an electrolyte, a liquid crystal device was produced.

EXAMPLE 11

In the same manner as in Example 1 except using 0.05% by weight of tetraethylammonium chloride as an electrolyte, a liquid crystal device was produced.

EXAMPLE 12

In the same manner as in Example 1 except using no electrolyte, a liquid crystal device was produced.

EXAMPLE 13

In the same manner as in Example 1 except using poly(4-cyanophenyl-4'-octyloxybenzoate methylsiloxane) as the liquid crystalline polymer, a liquid crystal device was produced.

EXAMPLE 14

In the same manner as in Example 1 except using poly(4-methoxyphenyl-4'-octyloxybenzoate methylsiloxane) as the liquid crystalline polymer, a liquid crystal device was produced.

EVALUATION TESTS

With the liquid crystal devices produced in Examples 1-14, a response speed from the transparent state to the opaque state and a response speed from the opaque state to the transparent state with the application of an alternating current of 1 kHz at room temperature were measured by radiating a He-Ne laser beam having a wavelength of 633 nm.

A temperature range in which the formed mixture film was in the smectic phase was determined by observing the state of the mixture film with a polarization microscope.

The results are shown in Table 1.

TABLE 1

| Example No. | Response speed (seconds) | | Smectic temp. range (°C.) |
|---|---|---|---|
| | Transparent → opaque | Opaque → transparent | |
| 1 | 0.6 (at 90 V) | 0.2 (at 90 V) | 0–110 |
| 2 | 0.6 (at 90 V) | 0.25 (at 90 V) | 0–87 |
| 3 | 0.13 (at 90 V) | 0.38 (at 90 V) | 0–60 |
| 4 | 0.12 (at 90 V) | 0.045 (at 90 V) | 0–64 |
| 5 | 0.05 (at 90 V) | 0.032 (at 90 V) | 0–63 |
| 6 | 0.05 (at 90 V) | 0.032 (at 90 V) | 0–62 |
| 7 | 0.15 (at 90 V) | 0.05 (at 90 V) | 0–66 |
| 8 | 0.16 (at 90 V) | 0.046 (at 90 V) | 0–62 |
| 9 | 0.13 (at 90 V) | 0.043 (at 90 V) | 0–60 |
| 10 | 0.6 (at 90 V) | 0.17 (at 90 V) | 0–100 |
| 11 | 0.6 (at 90 V) | 0.22 (at 90 V) | 0–110 |
| 12 | Not opacified | — | — |
| 13 | 0.45 (at 90 V) | 0.25 (at 90 V) | 0–113 |
| 14 | 0.70 (at 90 V) | 0.17 (at 90 V) | 0–104 |

From Table 1, it is understood that the liquid crystal devices produced in Examples 1-11, 13 and 14 were in the smectic phase in the wide temperature range including room temperature and has the orientated state with memory. It is also understood that the response times from the transparent state to the opaque state and from the opaque state to the transparent state were short.

Since, in the liquid crystal device of the present invention, the mixture film of the side chain type liquid crystalline polymer and the low molecular weight liquid crystals sandwiched by a pair of transparent electrodes at least one of which is transparent contains at least two low molecular weight liquid crystals and 0.05 to 1 parts by weight of the electrolyte per one part by weight of the whole liquid crystals, it can be used in a wide temperature range including room temperature and is excellent in the response speed, stability and reproducibility.

According to the present invention, the liquid crystal device of the present invention can be produced without carrying out any redundant step.

Since the liquid crystal device of the present invention uses no polarization plate, its efficiency of utilizing light is high, and it is particularly suitable for a reflection type or projection type display.

The variable traffic control sign, the light-adjusting window and the liquid crystal glare-proof mirror of the present invention will be explained by making reference of the accompanying drawings.

FIG. 1 is a perspective view of the variable traffic control sign of the present invention in use.

As shown in FIG. 1, a part of a traffic sign 1 which is suspended from a pole 30 consists of the liquid crystal device section 2.

Figure 2:
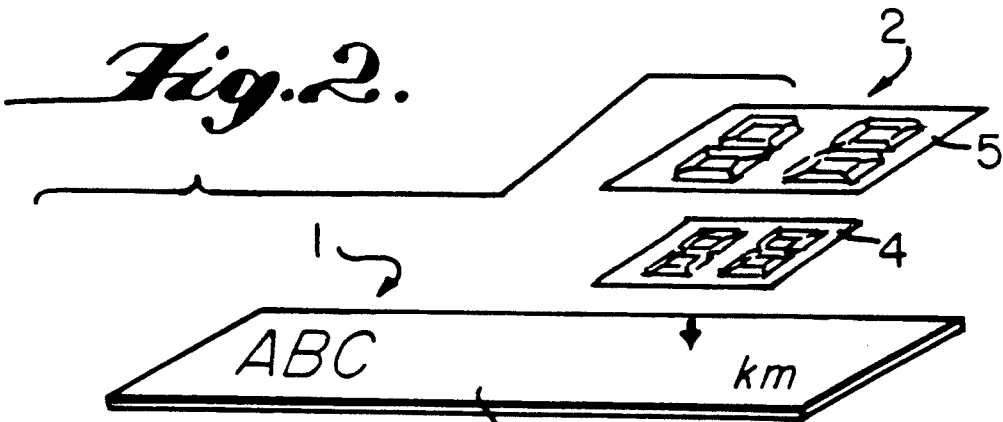
FIG. 2 is an exploded perspective view of the variable traffic control sign of FIG. 1.

As shown in FIG. 2, the liquid crystal device section 2 is formed by laminating a liquid crystal device 4 and a mask 5 on a panel 3 which constitutes the traffic sign 1 and displays a necessary information.

Figure 3:
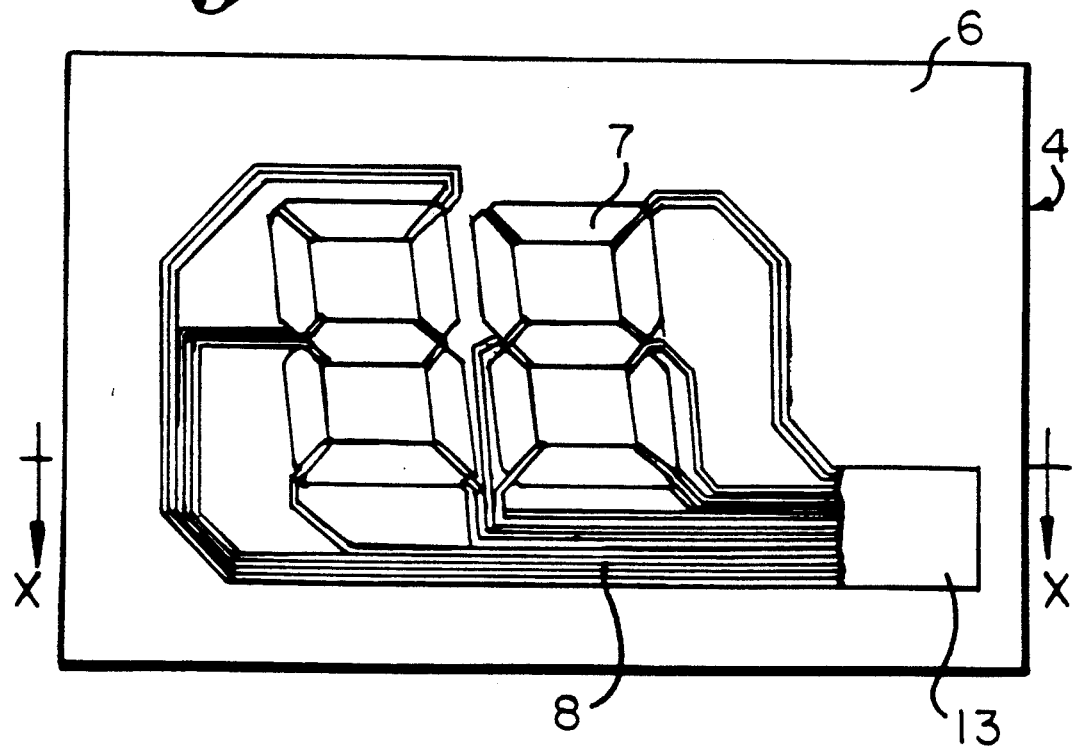
FIG. 3 is a plane view of an example of a liquid crystal device of the present invention.
Figure 4:
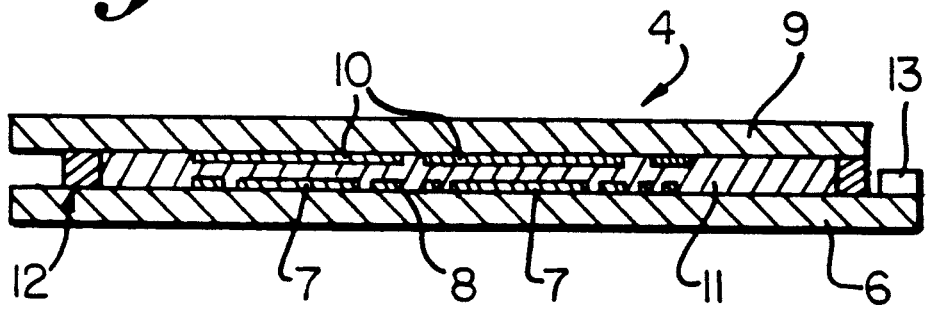
FIG. 4 is a cross sectional view of the liquid crystal device of FIG. 3 along the line X—X.

FIG. 3 is a plane view showing the detail of the liquid crystal device 4, and FIG. 4 is a cross section of the liquid crystal device 4 along the line X—X. As shown in FIG. 4, on an upper surface of a lower substrate 6, a display electrode 7 and a wiring electrode 8 are provided, and on a lower surface of an upper substrate 9, a counter electrode 10 is provided. Then, the upper and lower substrates 6 and 9 sandwich a liquid crystal layer 11. Edges of the liquid crystal layer 11 are sealed with sealing materials 12. An extending part of the lower substrate 6 beyond the edge of the upper substrate 9 has electrodes for display input.

As the lower and upper substrates 6 and 9, for example, transparent polyethylene terephthalate films or polyether sulfone films are used. The film thickness is preferably from 50 to 200 $\mu$m. As the electrodes 7, 8 and 10, a thin film of ITO (indium-tin oxide) or $SnO_2$ having a thickness of about 0.01 to 0.1 $\mu$m formed by vapor deposition or sputtering can be used.

As an optical material to be used in the liquid crystal device 4, the following materials are preferably used:

(A) Polymer/Liquid Crystal Composite

This composite is a film-form material which is prepared by dissolving a matrix polymer and a liquid crystal in a solvent, cast coating a solution on a substrate such as a transparent electrode (for example, the lower substrate 6 of FIG. 4) and drying the coated solution. On the polymer/liquid crystal composite, a plate substrate (for example, the upper substrate 9 of FIG. 4) is laminated (see Chemistry Letters, pp 813–816 (1989)).

The composite has a structure such that pores of the matrix polymer having a sponge-like structure are filled with the liquid crystal. Since the liquid crystal molecules are in a random state with no application of a voltage, the incident light is scattered so that the composite is opaque. After the application of the voltage to the polymer/liquid crystal composite, when a dielectric constant anisotropy $\Delta\epsilon$ ($\Delta\epsilon = \epsilon_{\parallel} - \epsilon_{\perp}$ in which $\epsilon_{\parallel}$ is a dielectric constant in a direction of a molecular axis and $\epsilon_{\perp}$ is a dielectric constant in a direction perpendicular to the molecular axis) is positive, the liquid crystal molecules are orientated in a direction of the electric field due to the electro-optic effect so that the incident light passes through the composite without being scattered and the polymer/liquid crystal composite becomes transparent.

(B) Liquid Crystalline Polymer/Low Molecular Weight Liquid Crystal Mixture

This mixture is prepared by cast coating a solution of a side chain type liquid crystalline polymer comprising a polymer main chain to which side chains corresponding to a liquid crystal compound are bonded through flexible carbon chains, etc. and the low molecular weight liquid crystal in a solvent on a plate substrate such as a transparent electrode (e.g. the lower substrate 6 of FIG. 4) and drying the coated solution. On the liquid crystalline polymer/low molecular weight liquid crystal composite, a plate substrate (e.g. the upper substrate 9 of FIG. 4) is laminated (see Chemistry Letters, pp 817–820 (1989)).

When a low frequency electric field is applied to the liquid crystalline polymer/low molecular weight liquid crystal mixture, since the electric charges move in accordance with the frequency in the mixture, the orientation of the liquid crystal is disturbed so that the incident is strongly scattered and the mixture becomes opaque.

When a high frequency electric field is applied to the mixture film, the liquid crystal molecules in the liquid crystalline polymer/low molecular weight liquid crystal mixture film are homeotropically orientated in the electric field direction so that the incident light passes through the mixture film without being scattered and the mixture film becomes transparent.

The liquid crystal device comprising this mixture has a memory to maintain the light-scattering state or the light-non-scattering state after the electric field is removed.

In the liquid crystal device using either of the optical materials (A) and (B), it is possible to form the liquid crystal film which has a liquid crystal display function such as the film-form polymer/liquid crystal composite or the film-form liquid crystalline polymer/low molecular weight liquid crystal mixture by coating and drying the solution containing the matrix polymer and the liquid crystal or the solution-containing the liquid crystalline polymer and the low molecular weight liquid crystal mixture. Therefore, the size of the liquid crystal display device section 2 is easily enlarged.

EXAMPLE 15

The variable traffic control sign 1 shown in Figs. 1 and 2 was produced. In the liquid crystal device 4 provided on the panel 3, transparent polyether sulfone (PES) films each having a thickness of 100 $\mu$m were used as the upper and lower substrates 6 and 9 shown in FIGS. 3 and 4. As the liquid crystal layer 11, was used a mixture film (thickness of 10 $\mu$m) of a side chain type liquid crystalline polymer (poly(4-cyanophenyl-4'-hexcyloxybenzoate methylsiloxane) (30 parts), low molecular weight liquid crystals (E63 manufactured by Merk Japan) (20 parts) and a slight amount of tetramethylammonium bromide, which film was formed with a bar coater. Each of the electrodes 7, 8 and 10 was patterned by etching the transparent conductive film.

To the liquid crystals present in a part sandwiched by the display electrode 7 and the counter electrode 10, a voltage was applied through the electrode 13 for display input from a driving apparatus (not shown). As the sealing material 12, a thermosetting epoxy resin was used.

When the alternating current (200 Hz, 60 Vrms) was applied to all the electrodes 13 for display input in the produced variable traffic control sign, all the liquid crystal devices turned transparent in about 3 seconds, and no sign was displayed on the liquid crystal display device section 2. When a direct current (60 V) was applied to a part of the electrodes 13 for display input, corresponding displaying parts turned opaque (light-scattering state) and numerals were displayed.

EXAMPLE 16

In the same manner as in Example 15 except using a composite of a polymer (methacrylic resin) and liquid crystals (E63 of Merk Japan) as the liquid crystal layer, a variable traffic control sign was produced.

The formed liquid crystal layer was in the opaque state when no voltage was applied. When an alternating current (200 Hz, 30 V) was applied to a part of the electrodes 13 for display input, the corresponding parts turned transparent. As the result, numerals were displayed from the transparent parts and the opaque parts to which no voltage was applied.

In the above explanations, a part of the variable traffic control sign has the liquid crystal display device section, though it is possible to assemble the whole traffic control sign with the liquid crystal display devices.

According to the variable traffic control sign of the present invention, since the mixture of the liquid crystalline polymer and the low molecular weight liquid crystal or the composite of the polymer and the liquid crystal is used as the liquid crystal layer and the light-transmitting state and the light-scattering state are reversibly changed, the letters, symbols or figures are displayed on the traffic control sign by light scattering (or light transmission). In such case, the liquid crystal display device of the present invention requires no polarization plate used in the conventional TN type liquid crystal device and has no limitation on the angle of view field. Since the liquid crystal device using the mixture of the liquid crystalline polymer and the low molecular weight liquid crystal has the memory, the voltage is applied only when the display sign is to be changed. Therefore, the variable traffic control sign is advantageous in view of durability.

Since the liquid crystal display device of the present invention is formed by sandwiching the liquid crystal between suitable transparent electrodes, its thickness can be about 1 mm or less. The present invention can provide the cheap traffic control sign having a simple structure and a light weight.

The liquid crystal device comprising the liquid crystal mixture which has the reversible bistability between the light-transmitting state and the light-scattering state is in the light-scattering state with the application of the direct current or the alternating current of low frequency (for example, 100 Hz or lower), while it is in the light-transmitting state with the application of the alternating current of high frequency (for example, 100 Hz or higher). Further, when the no voltage is applied, its light-scattering or light-transmitting state is maintained.

When such liquid crystal device is used in the light-adjusting window, the voltage is applied only when the light transmittance of the window is to be changed. Therefore, any transmittance of the window can be maintained with a low power consumption for a long time.

Now, the light-adjusting window of the present invention is explained by making reference to the accompanying drawings.

Figure 5:
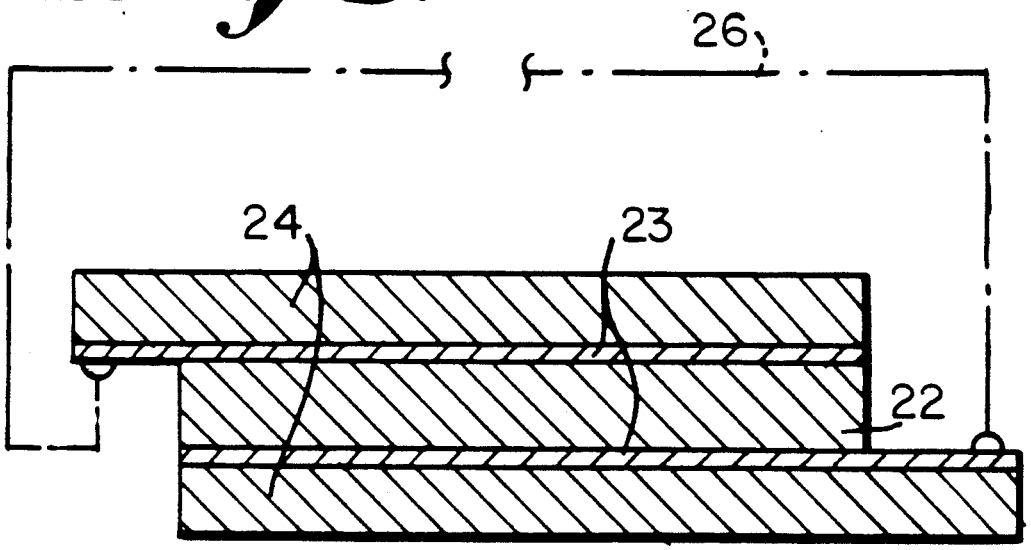
FIG. 5 is a cross sectional view of one-example of a light-adjusting window of the present invention.
Figure 6:
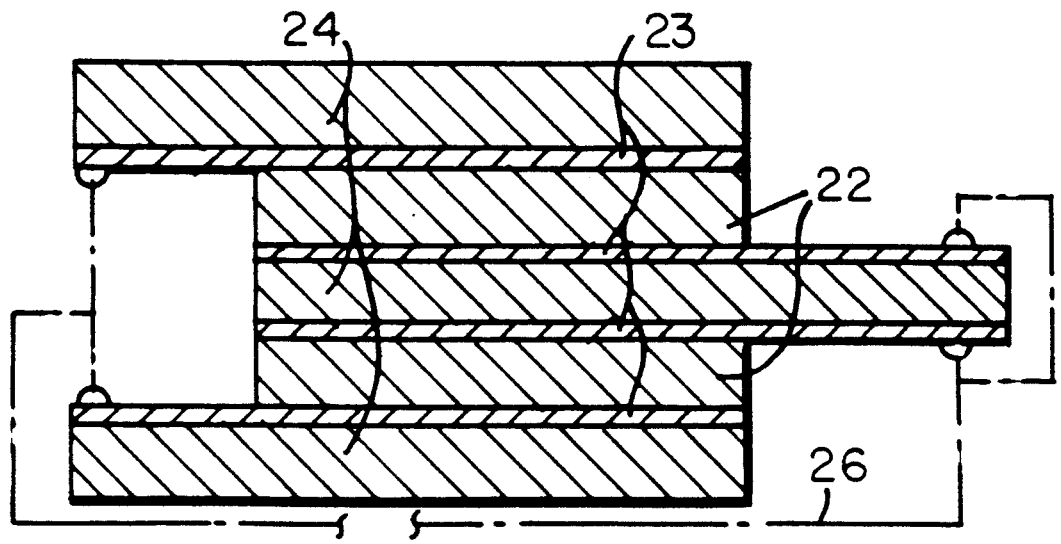
FIG. 6 is a cross sectional view of another example of the light-adjusting window of the present invention.

FIGS. 5 and 6 show cross sectional view of two examples of the light-adjusting window of the present invention. Among them, FIG. 5 shows the single layer one, while FIG. 6 shows the laminated one. The light-adjusting windows of FIGS. 5 and 6 have a structure comprising a liquid crystalline polymer/low molecular weight liquid crystal mixture film 22 and a pair of transparent substrates 24 (e.g. plastic films, plastic plates, etc.) inner surfaces of which are coated by transparent electrodes 23 and which sandwich the mixture film 22.

Numeral 26 stands for a wiring for applying the voltage between the transparent electrodes 23,23. The wiring 26 is connected with a driving apparatus (not shown). The wiring 26 is used only when the transmittance of the window is to be changed and usually detached from the transparent electrodes 23,23.

This type of window is explained in detail by the following examples.

EXAMPLE 17

In a mixed solvent of acetone and dichloroethane (50:50 by weight), a liquid crystalline polymer [poly(4-cyanophenyl-4'-hexyloxybenzoate methylsiloxane] (30 parts), low molecular weight liquid crystals (E63 manufactured by Merk Japan) (20 parts) and a slight amount of tetraethylammonium bromide were dissolved to obtain a coating solution.

The coating solution was coated on a transparent film having a transparent electrode (ITO) on its surface with a bar coater and dried at room temperature for 30 minutes. Then, another transparent film having the transparent electrode was laminated to obtain a light-adjusting window.

When the alternating current of 60 V (1 kHz) was applied between the electrodes, the window was changed to the light-transmitting state (transmittance of 85%) in about 2 seconds. When no voltage was applied, the same state was maintained. The transmittance was measured using the He-Ne laser beam (633 nm).

When the direct current of 60 V was applied, the mirror was changed to the light-scattering state (transmittance of 1.3%) in about 2.5 seconds. When no voltage was applied, the same state was maintained. By adjusting the application time of the voltage, the transmittance was freely controlled between 85% and 1.3%.

EXAMPLE 18

In the same manner as in Example 17 except using 25 parts of the liquid crystalline polymer [poly(4-methoxyphenyl-4'-hexyloxybenzoate methylsiloxane] and 25 parts of the low molecular weight liquid crystals, a light-adjusting window was produced.

When the alternating current of 60 V (1 kHz) was applied between the electrodes, the window was changed to the light-transmitting state (transmittance of 84%) in about 1.8 seconds. When no voltage was applied, the same state was maintained.

When the direct current of 60 V was applied, the mirror was changed to the light-scattering state (transmittance of 1.3%) in about 3.4 seconds. When no voltage was applied, the same state was maintained. By adjusting the application time of the voltage, the transmittance was freely controlled between 84% and 1.3%.

EXAMPLE 19

From the window produced in Example 17 or 18, the light-adjusting window having the laminate structure of FIG. 6 was produced. The window had improved contrast.

Since the light-adjusting window of the present invention comprises the liquid crystal device which has the reversible histability between the light-transmitting state and the light-scattering state, the voltage is applied only when the transmittance is to be changed. Therefore, when the suitable transmittance is maintained for a long time, power consumption is small and the window is economical. The light-adjusting window of the present invention is preferably used as a blind or a partition.

The above liquid crystal mixture having the reversible histability can be used in the liquid crystal glare-proof mirror.

Such glare-proof mirror is explained by making reference to the accompanying drawings.

Figure 7:
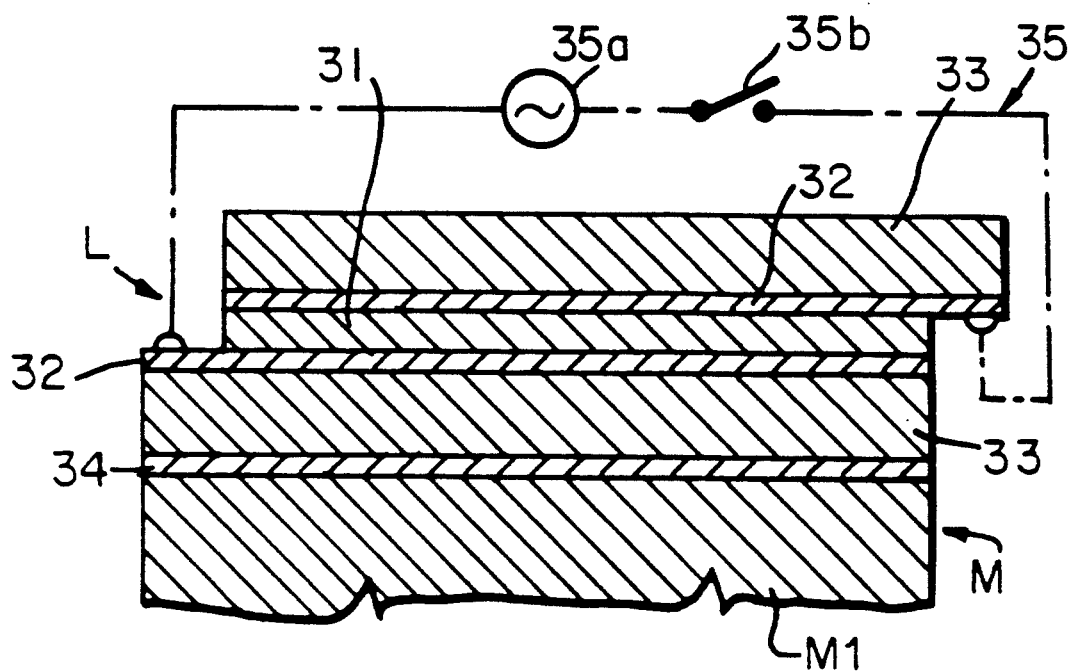
FIG. 7 is a cross sectional view of one example of a liquid crystal glare-proof mirror of the present invention.

FIG. 7 is a cross sectional view of one example of the liquid crystal glare-proof mirror of the present invention.

As seen from FIG. 7, the liquid crystal glare-proof mirror of this example comprises a liquid crystal device L consisting of a pair of transparent substrates 33,33 on one surfaces of which respective transparent electrodes are formed and a liquid crystalline polymer/low molecular weight liquid crystal mixture film 1 sandwiched between the pair of the substrates, the liquid crystal device L being laminated on and integrated with a mirror body M through an adhesive layer 34.

As the liquid crystalline polymer/low molecular weight liquid crystal mixture film 31, the above described mixture film of the side chain type liquid crystalline polymer and the low molecular weight liquid crystal is used. To the liquid crystalline polymer/low molecular weight liquid crystal mixture film 31, a suitable amount of a dichroic dye can be added to improve the glare-proof effect in the light-scattering state.

Since the above liquid crystalline polymer/low molecular weight liquid crystal mixture film 31 contains the liquid crystalline polymer, it is self-supporting without the use of any spacers. If desired, spacers such as glass beads, resin particles and the like can be compounded in the mixture film.

As the transparent substrate 33, a transparent plastic film or plate, or a glass plate is used. As the transparent electrode 32 formed on the surface of the transparent substrate 33, a thin film of a known transparent electrode material such as the ITO film can be used.

Between the transparent electrodes 32,32, a driving apparatus 35 comprising a power source 35a and a switch 35b is connected. The driving apparatus is used when the transmittance of the liquid crystalline polymer/low molecular weight liquid crystal mixture film 31 is changed. As the power source 35a, a source generating the direct current voltage or a variable frequency source generating the alternating current voltage having various frequencies is used.

The liquid crystal device L consisting of the liquid crystalline polymer/low molecular weight liquid crystal mixture film 31, the transparent electrodes 32 and the transparent substrates 32 may be produced by cast coating a solution of the liquid crystalline polymer and the low molecular weight liquid crystal dissolved in a solvent on the surface of one transparent substrate 33, drying it to from the liquid crystalline polymer/low molecular weight liquid crystal mixture film 1 and laminating the other transparent substrate 3 on the liquid crystalline polymer/low molecular weight liquid crystal mixture film (see, for example, Japanese Patent Kokai Publication No. 127494/1990 and Chem. Lett., pp 817-820 (1989)).

As the mirror body M, a generally used mirror comprising a transparent substrate M1 such as a glass plate and a light-reflecting film (not shown) formed on the back of the transparent substrate M1.

As the adhesive layer 34 which bonds the liquid crystal device L and the mirror body M, an adhesive, which bonds the both and becomes transparent when cured or hardened so as not to disturb the light transmission, is used.

Since the above liquid crystal glare-proof mirror can be produced by using the conventional mirror as the mirror body M and bonding the liquid crystal device L with the adhesive, its production is very easy.

Next, another example of the liquid crystal glare-proof mirror will be explained by making reference to FIG.

Figure 8:
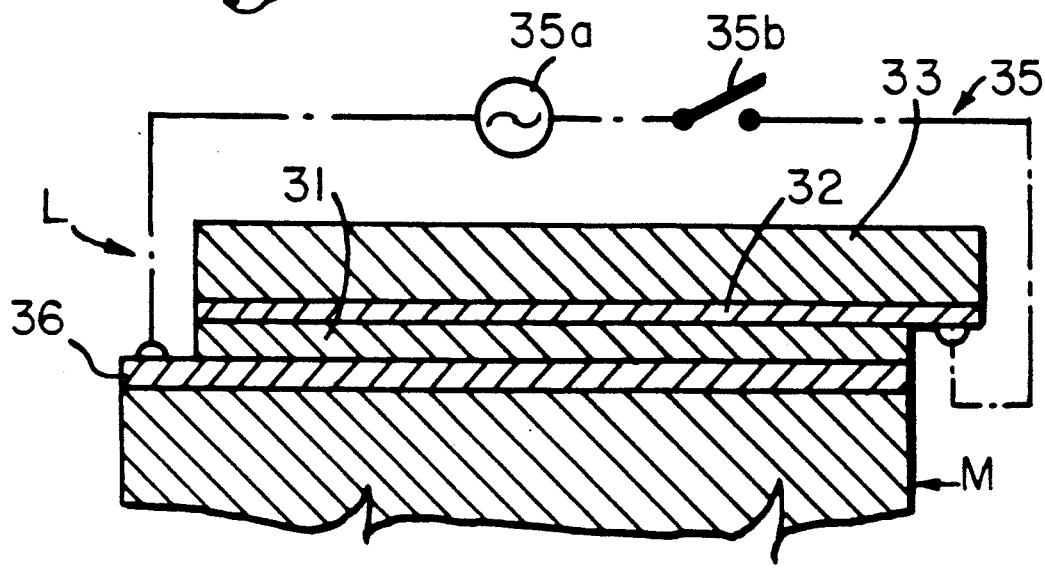
FIG. 8 is a cross sectional view of another example of the liquid crystal glare-proof mirror.

As seen from FIG. 8, the liquid crystal glare-proof mirror of this example comprises a liquid crystal device L which is integral with the mirror body M and formed by sandwiching the liquid crystalline polymer/low molecular weight liquid crystal mixture film 31 between the transparent substrate 33 having the transparent electrode 32 on one surface thereof and the mirror body M on a surface of which a metal electrode 36 is formed. The above metal electrode 36 also functions as a light-reflecting film of the mirror body M.

In the above construction, since the metal electrode 36 and the mirror body M function as one of the electrodes which sandwich the liquid crystalline polymer/low molecular weight liquid crystal mixture film 31 and the substrate, respectively and also the metal electrode 36 functions as the light-reflecting film of the mirror body M, the number of the layers is reduced so that the structure of the liquid crystal glare-proof mirror is simplified.

In the above two examples, a single layer of the liquid crystalline polymer/low molecular weight liquid crystal mixture film 31 was used, although it is possible to laminate a plural liquid crystalline polymer/low molecular weight liquid crystal mixture films to improve the contrast.

In the example of FIG. 8, as the mirror body M, one having the metal electrode 36 which functions as the light-reflecting film was used, although it is possible to use a usual mirror having the reflecting film on its back on the surface of which the transparent electrode formed.

The glare-proof mirror of the present invention will be explained with specific examples.

EXAMPLE 20

In dichloroethane (160 parts), a liquid crystalline polymer [poly(4-methoxyphenyl-4'-hexyloxybenzoate methylsiloxane)] (15 parts), the low molecular weight liquid crystals (E63 manufactured by Merk Japan) (15 parts), benzoguanamine resin particles having a particle size of 7 μm as the spacer (1.6 parts) and a slight amount of tetraethylammonium bromide were dissolved to obtain a coating solution.

The coating solution was coated on a transparent substrate on which surface an ITO film was formed as a transparent electrode with a bar coater and dried at room temperature for 30 minutes to form a liquid crystalline polymer/low molecular weight liquid crystal mixture film. On the mixture film, a mirror body on which a Cr electrode which functions as the light-reflecting film was formed was laminated to obtain the liquid crystal glare-proof mirror having the layered structure of FIG. 8 in which the liquid crystal device L and the mirror body M are integrated together.

Between the electrodes of the above glare-proof mirror, a driving apparatus 35 comprising a variable frequency type power source 35a and a switch 35b was connected as shown in FIG. 8. When the alternating current of 1 kHz (60 V) was applied between the electrodes, the liquid crystal device was changed to the light-transmitting state in about one second. When the application of the voltage was stopped, the same state was maintained.

When the direct current (60 V) was applied, the liquid crystal device was changed to the light-scattering state in about 3 seconds. When the application of the voltage was stopped, the same state was maintained.

Then, the light beam from the He-Me laser (wavelength of 633 nm) as a light source was irradiated on the above liquid crystal glare-proof mirror and the reflected light was received by a photocell to measured an amount of the reflected light. From the irradiated light amount and the reflected light amount, a reflectance of the liquid crystal glare-proof mirror was calculated. The reflectance was 64% in the light-transmitting state and 5% in the light-scattering state.

By adjusting the application time of the voltage, the reflectance was freely controlled between 64% and 5%.

EXAMPLE 21

In the same manner as in Example 20 except adding a dichroic dye (S-334 of Mitsui-Toatsu) (0.3 part) to the coating solution, a liquid crystal glare-proof mirror having the layered structure of FIG. 8 in which the liquid crystal device L and the mirror body M are integrated together was produced.

Between the electrodes of the above glare-proof mirror, the driving apparatus 35 comprising the variable frequency type power source 35a and the switch 35b was connected as shown in FIG. 8. When the alternating current of 1 kHz (60 V) was applied between the electrodes, the liquid crystal device was changed to the light-transmitting state in about one second. When the application of the voltage was stopped, the same state was maintained.

When the direct current (60 V) was applied, the liquid crystal device was changed to the light-scattering state in about one second. When the application of the voltage was stopped, the same state was maintained.

The reflectance of the liquid crystal glare-proof mirror was measured in the same manner as in the above Example. The reflectance was 56% in the light-transmitting state and 8% in the light-scattering state.

By adjusting the application time of the voltage, the reflectance was freely controlled between 56% and 8%.

EXAMPLE 22

The coating solution prepared in Example 20 was coated on the transparent substrate having the ITO film as the transparent electrode thereon with a bar coater and dried at room temperature for 30 minutes to form a liquid crystalline polymer/low molecular weight liquid crystal mixture film. Thereafter, on the mixture film, another transparent substrate having the ITO film thereon was laminated to obtain a liquid crystal device.

Then, the above liquid crystal device was bonded on a surface of a mirror body having a light-reflecting film on its back with an adhesive for optical use ("LENS BOND" manufactured by Oyo Koden Kenkyushitsu Co., Ltd.) and the adhesive was hardened by the thermal treatment at 70° C. for 70 minutes to obtain a liquid crystal glare-proof mirror having the layered structure of FIG. 7 in which the liquid crystal device L and the mirror body M are bonded together by the adhesive layer 34 was produced.

Between the electrodes of the above glare-proof mirror, the driving apparatus 35 comprising the varying frequency type power source 35a and the switch 35b was connected as shown in FIG. 7. When the alternating current of 1 kHz (60 V) was applied between the electrodes, the liquid crystal device was changed to the light-transmitting state in about one second. When the application of the voltage was stopped, the same state was maintained.

When the direct current (60 V) was applied, the liquid crystal device was changed to the light-scattering state in about one second. When the application of the voltage was stopped, the same state was maintained.

The reflectance of the liquid crystal glare-proof mirror was measured in the same manner as in the above Example. The reflectance was 46% in the light-transmitting state and 3% in the light-scattering state.

By adjusting the application time of the voltage, the reflectance was freely controlled between 46% and 3%.

Since the liquid crystal glare-proof mirror of the present invention comprises the liquid crystal device which has the reversible histability between the light-scattering state and the light-transmitting state; the voltage is applied only when the transmittance is to be changed. Therefore, when the suitable transmittance is maintained for a long time, power consumption is small and the mirror is economical. The liquid crystal glare-proof mirror of the present invention is preferably used as an automobile mirror such as a rear-vision mirror.

What is claimed is:

1. A liquid crystal device comprising:
    a pair of electrodes at least one of which is transparent; and
    a mixture film disposed between said electrodes, said mixture film comprising:
        a side chain type liquid crystalline polymer;
        at least two low molecular weight liquid crystals; and
        an electrolyte which has a weight of 0.005% to 1% of a total weight of said mixture film.

2. The liquid crystal device according to claim 1, wherein one of said at least two low molecular weight liquid crystals contain a replacement low molecular weight liquid crystal which can replace side chain liquid crystal moieties of said liquid crystalline polymer.

3. The liquid crystal device according to claim 1, wherein said liquid crystalline polymer is represented by at least one of the following formulas:

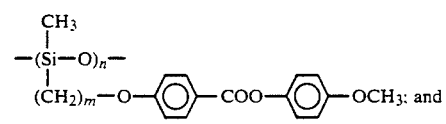

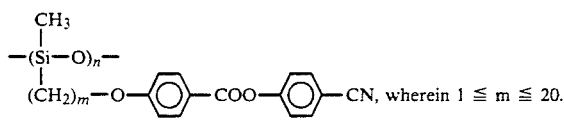

wherein $1 \leq m \leq 20$.

4. The liquid crystal device according to claim 3, wherein said replacement low molecular weight liquid crystal is represented by at least one of the following formulas:

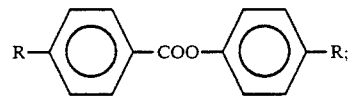

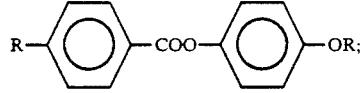

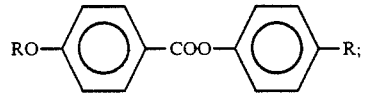

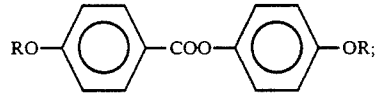

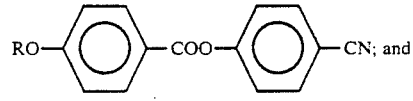

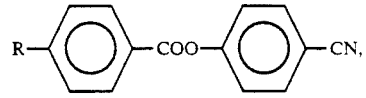

wherein R is a $C_1$-$C_{20}$ alkyl group, and wherein one or both of the benzene rings can be replaced with a cyclohexane rings.

5. The liquid crystal device according to claim 1, wherein said liquid crystalline polymer is represented by one of the following formulas:

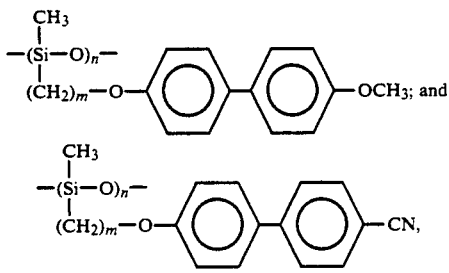

wherein $1 \leq m \leq 20$.

6. The liquid crystal device according to claim 5, wherein said replacement low molecular weight liquid crystal is represented by at least one of the following formulas:

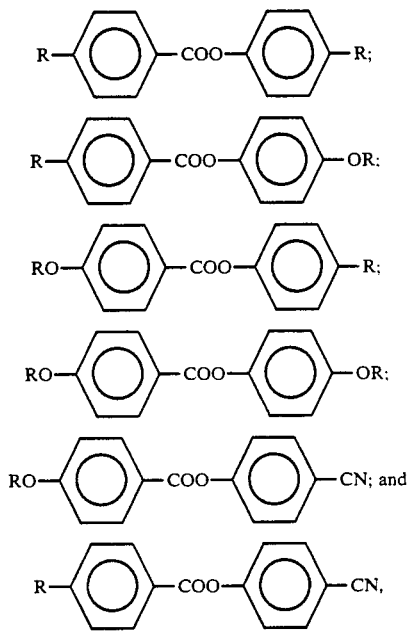

wherein R is a $C_1$-$C_{20}$ alkyl group, and wherein one or both of the benzene rings can be replaced with a cyclohexane rings.

7. The liquid crystal device according to claim 1, wherein said electrolyte is a quaternary ammonium salt.

8. The liquid crystal device according to claim 7, wherein said quaternary ammonium salt is a salt of the formula:

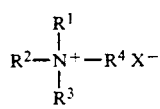

wherein $R^1$, $R^2$, $R^3$ and $R^4$ are the same or different and each an alkyl group such as a methyl group, an ethyl group, a propyl group, an isopropyl group, a butyl group, a pentyl group or a hexyl group; and X is F, Cl, Br, I, $ClO_4$, $PF_4$ or $BF_4$.

9. A method for producing a liquid crystal device comprising the steps of:
applying a solution containing a side chain type liquid crystalline polymer, at least two low molecular weight liquid crystals and electrolyte on a first electrode;
drying and solidifying the applied solution to form a mixture film containing said side chain type liquid crystalline polymer, said at least two low molecular weight liquid crystals and said electrolyte; and
placing a second electrode on the mixture film.

10. A method for producing a liquid crystal device comprising steps of:
placing an amount of a mixture containing a side chain type liquid crystalline polymer, at least two low molecular weight liquid crystals, an electrolyte and a spacer on a surface of a first electrode film;
placing a second electrode film on the surface of said first electrode film; and
compressing said first and second electrode films from an edge portion carrying said mixture with at least one roll.

11. A variable traffic control signal having a liquid crystal device comprising:
one of a smectic mixture and an induced smectic mixture having a reversible bistability between a light-transmitting state and a light-scattering state, wherein said one of said smectic mixture and said induced smectic mixture comprises:
a liquid crystalline polymer;
a low molecular weight liquid crystal; and
0.005% to 1.0% by weight of an electrolyte.

12. A light-adjusting window comprising a liquid crystal device which has a reversible bistability between a light-scattering state and a light-transmitting state; wherein said liquid crystal device comprises:
a pair of transparent substrates; and
a mixture film, disposed between said pair of transparent substrates, comprising:
a liquid crystalline polymer;
a low molecular weight liquid crystal; and
0.005% to 1.0% by weight of an electrolyte.

13. A liquid crystal glare-proof mirror comprising:
a mirror body; and
a liquid crystal device which has a reversible bistability between a light-scattering state and a light-transmitting state; wherein said liquid crystal device comprises:
a pair of transparent substrates; and
a mixture film, disposed between said pair of transparent substrates, comprising:
a liquid crystalline polymer;
a low molecular weight liquid crystal; and
0.005% to 1.0% by weight of an electrolyte.

14. A liquid crystal glare-proof mirror comprising:
a mirror body having a metal electrode; and
a liquid crystal device which has a reversible bistability between a light-scattering state and a light-transmitting state, wherein said liquid crystal device comprises:
a transparent substrate having a transparent electrode; and
a mixture film, disposed between said metal electrode and said transparent electrode, comprising:
a liquid crystalline polymer;
a low molecular weight liquid crystal; and
0.005% to 1.0% by weight of an electrolyte.

* * * * *